(12) United States Patent
Chen et al.

(10) Patent No.: US 7,758,775 B2
(45) Date of Patent: Jul. 20, 2010

(54) GREEN-EMITTING PHOSPHORS AND PROCESS FOR PRODUCING THE SAME

(75) Inventors: Teng-Ming Chen, Hsinchu (TW); Yi-Chen Chiu, Hsinchu (TW)

(73) Assignee: National Chiao-Tung University, Hsinchu (TW)

( * ) Notice: Subject to any disclaimer, the term of this patent is extended or adjusted under 35 U.S.C. 154(b) by 351 days.

(21) Appl. No.: 11/818,366

(22) Filed: Jun. 14, 2007

(65) Prior Publication Data
US 2008/0237539 A1 Oct. 2, 2008

(30) Foreign Application Priority Data
Apr. 2, 2007 (TW) .............. 96111611 A

(51) Int. Cl.
*C09K 11/79* (2006.01)
(52) U.S. Cl. .............................. 252/301.4 F
(58) Field of Classification Search ............ 252/301.4 F
See application file for complete search history.

(56) References Cited

U.S. PATENT DOCUMENTS

| 5,998,925 | A | 12/1999 | Shimizu et al. |
| 6,669,866 | B1 | 12/2003 | Kummer et al. |

OTHER PUBLICATIONS

Kunimoto et al, "Ca(Ia,Gd)4Si3O13:Tb3+ Green PDP phosphor for Xe2 excimer band exciation", The 311th Meeting technical Digest, Feb. 10, 2006, pp. 1-7.*

Yamane et al, "Luminescent propeties of Tb-activated rare earh oxyapatite silicate MLn4Si3O13(M=Ca,Sr,Ln=La,Gd)", Phys. Stat. Sol. (c) 3, No. 8, pp. 2705-2708, Sep. 4, 2006.*

Han et al, "Effects R3+ on the phooluminescent propeties of Ca2R8(SiO4)602:A (R=Y,La,Gd;A=Eu3+,Tb3+) phosphor films prepared by the sol-gel process", J. Phys.:condens. matter, 16, pp. 2745-2755, Apr. 2, 2004.*

Translation for Kunimoto et al article.*

$Ca(LaGd)_4Si_3O_{13}Tb^{3+}$ Green PDP Phosphor $Xe_2$ Excimer Band Excitation (Phosphors Research Society, the 311th Meeting Technical Digest, Feb. 10, 2006) presented by T. Kunimoto et al. w/ English Abstract.

$Ca(Eu_{1-x}La_x)_4Si_3O_{13}$ Red Phosphor and Its Application to Three-Band Type White LEDs. (J. Ilum. Engng. Inst. Jpn. vol. 88 No. 5, 2004) presented by K. Yamada et al.

Cation Ordering in $Ca_2La_8(SiO_4)_6O_2$, L.W. Schroeder & M. Mathew, Journal of Solid State Chemistry, 26, 383-387 (1978).

* cited by examiner

*Primary Examiner*—C. Melissa Koslow
(74) *Attorney, Agent, or Firm*—Bucknam and Archer

(57) ABSTRACT

This invention relates to a green phosphor and a process for producing the same, wherein the phosphor is represented by a chemical formula: $M(Tb_{1-x}La_x)_4Si_3O_{13}$, where M includes at least one of Ca and Sr, and $0<x<1$, and is obtained by mixing at proper ratios and calcining at a high temperature in an oxygen-containing atmosphere. When the produced phosphor is excited by a near ultra-violet light of 378 nm, a green light having its main peak at 541 nm is emitted, and the x and y values of its CIE coordinate are in respective ranges of (0.34-0.37) and (0.52-0.55). The method for producing the phosphor includes steps of weighing and mixing the ingredient powder, and calcining in the oxygen-containing atmosphere at high temperature to form the phospher.

4 Claims, 1 Drawing Sheet

GREEN-EMITTING PHOSPHORS AND PROCESS FOR PRODUCING THE SAME

FIELD OF THE INVENTION

The present invention relates to a phosphor emitting light of desired color by excitation and a producing process thereof, and particularly to a light-emitting diode device, which emits white light by exciting phosphor with near ultraviolet lights to emit green lights and by combining lights from a red-blue phosphor.

DESCRIPTION OF THE RELATED PRIOR ART

Currently, commercialized technology available for packaging white light emitting diode (LED) employs a red-green-blue (RGB) trichromatic chip, blue LED+yellow phosphor, blue LED+green and red phosphors, UV LED+RGB phosphors, and specifically ZnSe materials emitting white light. Therefore, currently, blue LED in combination with phosphors is the most common one among all conventional techniques for generating white light, since it is most technically leading and commercially competitive in terms of cost, lifespan, brightness, reliability, and so forth.

As to phosphor materials, the patent owned by Nichia Corp that uses Yttrium-Aluminum garnet (YAG) phosphor in combination with blue LED, shows superior light-emitting efficiency. Further disclosed are the light-emitting techniques that use Terbium-Aluminum garnet (TAG) in combination with blue LED available from Osram.

Regarding the light-emitting property, it arises from the electron transition caused by the defect of ion or lattice contained in the dopant forming a light-emitting core in the phosphor material. For example, the YAG phosphor mentioned in above Nichia's patent is composed of three kinds of polyhedrons and has a structure of "$(Y,Gd)_3Al_5O_{12}:Ce$; Yttrium-Aluminum garnet" pertaining to a cubic crystal system, wherein Al is the central atom of tetrahedron or octahedron composed of oxygen atoms, and Y is the central atom of dodecahedron. Furthermore, central atom of octahedron and dodecahedron is easily substituted by rare earth elements, e.g. Ce, Eu, Tb, Nd, etc., to form a solid solution, and thus dopants of different elements generate lights with different colors. For example, yellow light is generated while $Ce_{3+}$ is doped, and red and green lights are generated while $Eu^{3+}$ and $Tb^{3+}$ are doped respectively.

To differentiate from the YAG phosphor series mentioned in above Nichia's patent and to look for a better and diversified colored light combination, many new technologies are introduced in recent documents and publications in a fast-moving pace, especially for the technologies of green and red phosphors. For example, The article "$Ca(La,Gd)_4Si_3O_{13}$: $Tb^{3+}$ Green PDP Phosphor for $Xe_2$ Excimer Band Excitation" (*Phosphors Research Society*, The 311th Meeting Technical Digest, Feb. 10, 2006) presented by T. Kunimoto et al. disclosed the $Ca(La,Gd)_4Si_3O_{13}:Tb^{3+}$, which is applicable to LED and is featured by emitting visible green light when excited in the Vacuum Ultraviolet band; and the $Ca(La,Gd)_4Si_3O_{13}:Tb^3$ is made by calcining in air at 1200~1400° C. for 3 hours. The "$Ca(Eu_{1-x}La_x)_4Si_3O_{13}$ Red Phosphor and Its Application to Three-Band Type White LEDs" (*J. Ilium. Engng. Inst. Jpn*. Vol.88 No.5 2004) presented by K. Yamada et al. provided a phosphor, which is applicable to LED and is capable of emitting visible redlight, and is made by calcining in air at 1500° C. for 5 hours. However, in view of the limitation of lower color rendering property and poorer emitting efficiency than the YAG phosphor series mentioned in above-mentioned Nichia's patent, room for continuous breakthrough shall be always there.

SUMMARY OF THE INVENTION

In accordance with a first aspect of the present invention, a green phosphor is provided. The green phosphor is characterized in that cations of silicates, divalent anions, and a compound having trivalent elements such as Tb and La for use in combination are contained therein, wherein the compound having trivalent elements such as Tb and La, unlike the combination of doped elements as mentioned in the above-mentioned Kunimoto's document, has a color saturation close to that of the commercial product, ZnS:Cu,Al, from Nichia Corp. with a phosphorescence emitting intensity of 75% and more.

Preferably, the green phosphor is represented by a chemical formula: $M(Tb_{1-x}La_x)_4Si_3O_{13}$, wherein M comprises at least one of Ca and Sr, and $0<x<1$.

Preferably, the molar ratio of $Tb^{3+}$ to $La^{3+}$ is 0.2-0.25 moles of $Tb^{3+}$ to 0.75-0.8 moles of $La^{3+}$, and most preferably, 0.2 moles of $Tb^{3+}$ to 0.8 moles of $La^{3+}$.

In accordance with a second aspect of the present invention, a process for producing the green phosphor is provided. The process for producing the green phosphor according to the present invention comprising steps:

1) stoichiometrically weighing materials (A) divalent ions of Ca and/or Sr; (B) silicates; (C) oxide of trivalent Tb; and (D) oxide of trivalent La;

2) griding and mixing the weighed materials into homogeneous powders; and 3) calcining in air at 1300-1400° C. for 8-12 hours.

Preferably, the phosphor obtained by the producing method emits a green light with wavelength of a main peak at 541 nm after being excited with near ultraviolet light with a wavelength in the range of 378±15 nm and x and y values of a CIE coordinate of the emitted green light are in respective ranges of (0.34-0.37), and (0.52-0.55).

DETAILED DESCRIPTION OF THE INVENTION

The technical content and implementation means of the present invention are described in details by the following preferred embodiment.

The manufacture of the phosphor of the present invention is made by a high-temperature solid synthesis method. An X-ray diffractometer is used for determining crystalline phase of a sample from a synthesized phosphor, and a UV-VIS spectrometer, a phosphorescence spectrometer and a color analyzer are used for determining emitting properties thereof.

[Preparation of Phosphor]

A phosphor composition is prepared by weighing in accordance with the following ingredients and percentages:

(1) 150 mg of $Tb_4O_7$ (available from Aldrich Chemicals Company, U.S.A.; 99.99%, Mw=747.69), (2) 1.04 g of $La_2O_3$ (available from Aldrich Chemicals Company, U.S.A.; 99.99%, Mw=325.81), (3) 100 mg of $CaCO_3$ (available from Aldrich Chemicals Company, U.S.A.; >99%, Mw=100.09), and (4) 180 mg of $SiO_2$ (available from Aldrich Chemicals Company, U.S.A.; 99.6%, Mw=60.08), After being uniformly mixing and grinding, the ingredients are put into a crucible and transferred to a furnace to be calcined at 1200-1400° C. for 8-12 hours. Eventually, 1.45 g of phosphor with formula $Ca(Tb_{0.2}La_{0.8})_4Si_3O_{13}$ is obtained. (yield 98.64%, theoretical output 1.47 g).

[Test and Result]

Figure 1:
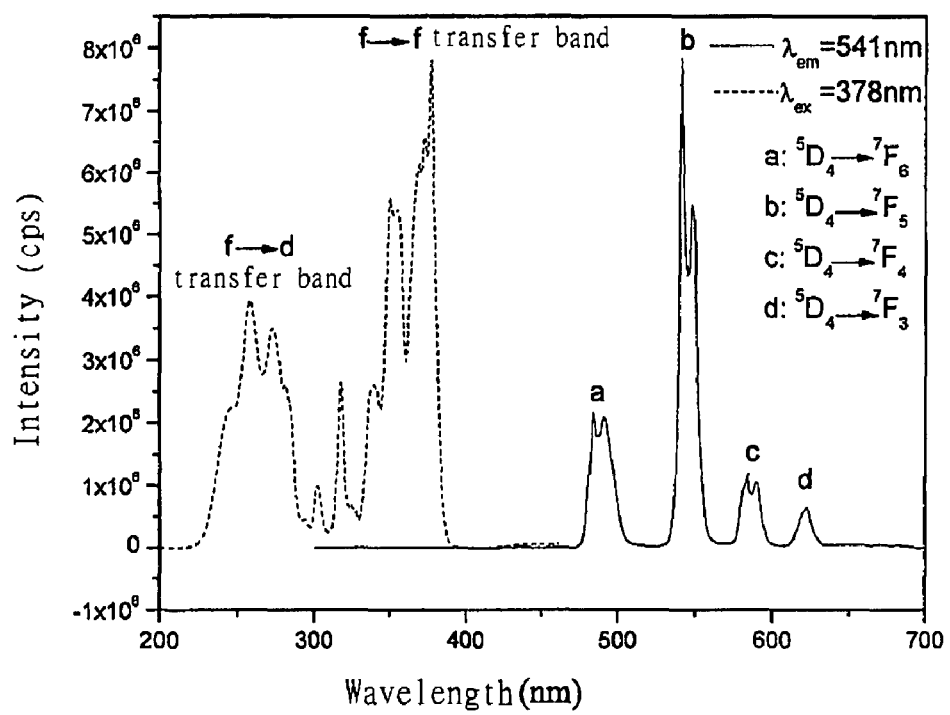
FIG. 1 is an emitting spectrum of the excited $Ca(Tb_{0.2}La_{0.8})_4Si_3O_{13}$ in a preferred embodiment of the present invention.
Figure 2:
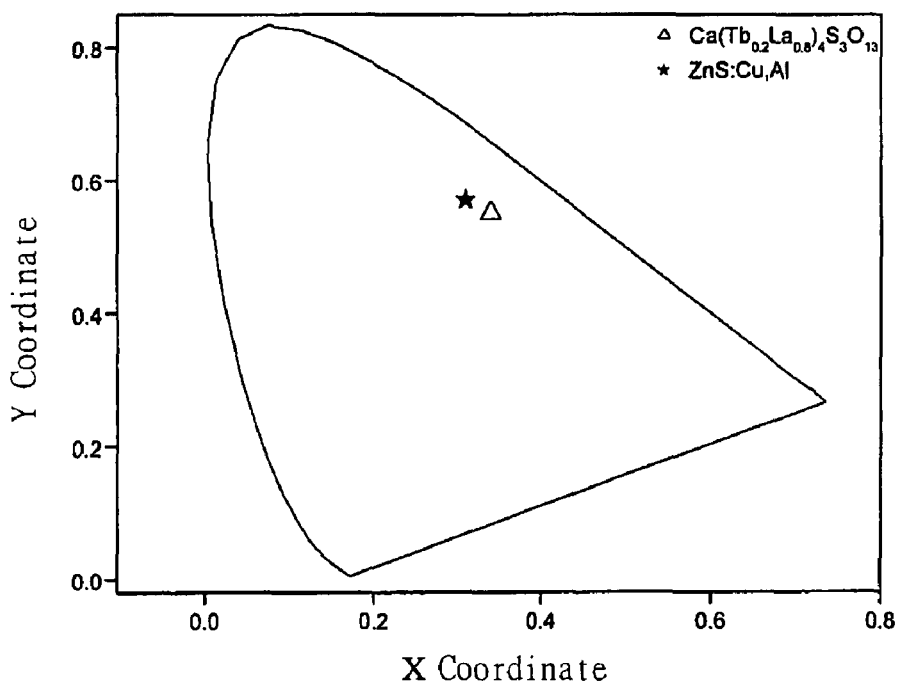
FIG. 2 is a CIE coordinate diagram of green light emitted from excited phosphor made in an preferred embodiment of the present invention.

The produced phosphor is excited by UV lights with wavelength in a range of 378±15 nm and green lights with intensity of $7.26860 \times 10^6$ cps are able to be generated. The emitting spectrum is shown in FIG. 1, in which those appeared below 400 nm are mainly green lights with f-f and f-d transfer bands and a main peak of visible lights at 541 nm. The test result is shown in FIG. 2, in which the CIE coordinate (x, y) values of green lights emitted from the excited phosphor of the present invention are sketched. The test result show that under excitation of near UV lights in a range of 378±15 nm, green lights with a main peak at 541 nm are able to be generated and the x and y values of a CIE coordinate are in respective ranges of (0.34-0.31) and (0.31-0.57). It is also shown in FIG. 1 that green light generated from ZnS:Cu,Al supplied by Nichia Corp., have a CIE coordinate (x, y) value (0.26, 0.54) with main peak at 522 nm, which is close to those obtained in the preferred embodiment of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

We claim:

1. A green phosphor compound characterized in that said phosphor is represented by a chemical formula: $M(Tb_{1-x}La_x)_4Si_3O_{13}$, wherein M comprises at least one of Ca and Sr, and $0.75 \leq X \leq 0.8$.

2. The green phosphor according to claim 1, wherein X=0.8.

3. A process for producing green phosphor represented by formula $M(Tb_{1-x}La_x)_4Si_3O_{13}$, wherein M comprises at least one of Ca and Sr and $0.75 \leq < X \leq 0.8$, said process comprises the steps of:

1) stoichiometrically weighing materials (A) divalent ions of Ca and/or Sr; (B) silicates; (c) oxide of trivalent Tb; and (D) oxide of trivalent La;

2) grinding and mixing the weighed materials into homogeneous powders; and 3) calcining in air at 1300-1400° C. for 8-12 hours.

4. The process for producing green phosphor according to claim 3, wherein X=0.8.

* * * * *